United States Patent [19]
Davis et al.

[11] 3,865,965
[45] Feb. 11, 1975

[54] METHOD FOR COOLING FOOD IN A FLUIDIZED BED

[75] Inventors: Walter L. Davis, Milton-Freewater; Henry V. Svehaug, Salem, both of Oreg.

[73] Assignee: Key Equipment Company, Milton-Freewater, Oreg.

[22] Filed: Feb. 2, 1972

[21] Appl. No.: 222,808

[52] U.S. Cl. .................................. 426/519, 426/524
[51] Int. Cl. .................................................. A23b 7/04
[58] Field of Search ............ 99/100, 103, 193, 199, 99/204, 1; 426/456, 467, 524, 519, 506, 507; 62/57; 34/10

[56]  References Cited
UNITED STATES PATENTS

| | | | |
|---|---|---|---|
| 2,103,925 | 12/1937 | Zarotschenzeff | 99/193 |
| 2,223,972 | 12/1940 | Sterling | 99/193 |
| 2,286,225 | 6/1942 | Noyes | 99/193 |
| 2,336,125 | 12/1943 | Preble | 426/524 |
| 2,364,049 | 12/1944 | Bensel | 99/193 |
| 2,437,859 | 3/1948 | Moulthrop | 99/193 |
| 2,597,066 | 5/1952 | Chase | 99/193 |
| 2,666,711 | 1/1954 | Crosset | 99/204 |
| 2,768,900 | 10/1956 | Vertner | 99/204 |
| 2,901,359 | 8/1959 | Forkner | 99/204 |
| 3,063,848 | 11/1962 | Van Gelder | 426/467 |
| 3,169,380 | 5/1965 | Callow | 62/57 |
| 3,356,512 | 12/1967 | Lemaire | 99/204 |
| 3,477,242 | 11/1969 | Lamby | 62/57 |

Primary Examiner—Wilbur L. Bascomb, Jr.
Assistant Examiner—Martin G. Mullen
Attorney, Agent, or Firm—Wells, St. John & Roberts

[57]  ABSTRACT

A method for cooling heated food products such as cut whole kernel corn and peas, is described in which the product is fed onto a perforated support plate and contacted with a water spray and air of a lower temperature. The air is blown up through the perforated support plate to suspend the food product in a fluidized bed and to pass through the bed to evaporate a portion of the water to further cool the food product. The support plate is directionally vibrated to convey the fluidized bed from an infeed end to a discharge end. A water spray system directs a water mist onto the fluidized bed to maintain the food product moist and to enable the air to evaporate a portion of the water.

4 Claims, 4 Drawing Figures

METHOD FOR COOLING FOOD IN A FLUIDIZED BED

BACKGROUND OF THE INVENTION

This invention relates to methods for cooling heated food products such as whole kernel corn, green peas, lima beans, asparagus, broccoli, brussels sprouts, cauliflower, potatoes and other vegetables. In the preparation of frozen vegetables, the vegetables are generally first washed and cleaned and then placed in a blancher or cooker and heated in an aqueous solution to a temperature above 150° F. and generally in the neighborhood of 180°–200° F. to destroy or substantially reduce the activity of those enzymes that would cause the frozen vegetables to deteriorate. Frequently, the aqueous solution contains additives such as sodium carbonate and sodium sulfite to tenderize and preserve the vegetables.

After the particular enzymes are destroyed or rendered ineffective it is desirable to rapidly cool the vegetables to a temperature below 100° F. and preferably to approximately room temperature before the vegetables are frozen.

It is found that it is difficult to rapidly cool the vegetables subsequent to the blanching operation without either substantially increasing or substantially decreasing the moisture content in the vegetables. The traditional method of cooling the blanched vegetables has been to dump the vegetables from the outlet of the blancher directly into a tank of water having a temperature below 100° F. and preferably approximately room temperature to rapidly cool the vegetables. However, one of the problems with this procedure is that while the vegetables are being cooled in the water bath they absorb additional mositure which seriously alters the natural taste of the vegetables. This is one of the reasons why frozen vegetables taste different from fresh vegetables. This taste difference has been particularly apparent between frozen corn and fresh corn.

On the other hand, if the vegetables are cooled by the application of air, dehydration takes place seriously decreasing the moisture content of the vegetable to produce an inferior frozen product.

One of the principal objects of this invention is to overcome the above identified problems and to provide a method and apparatus for cooling the food products from a blancher without seriously increasing or decreasing the moisture content of the food product.

An additional object of this invention is to provide a very simple method and inexpensive apparatus for cooling the food product from the blancher prior to freezing which does not seriously alter the taste of the food product.

These and further objects and advantage will become apparent upon the reading of the following detailed description of a preferred embodiment.

BRIEF DESCRIPTION OF THE DRAWINGS

A preferred embodiment of this invention is illustrated in the accompanying drawings, in which.

DETAILED DESCRIPTION OF A PREFERRED EMBODIMENT

Figure 1:
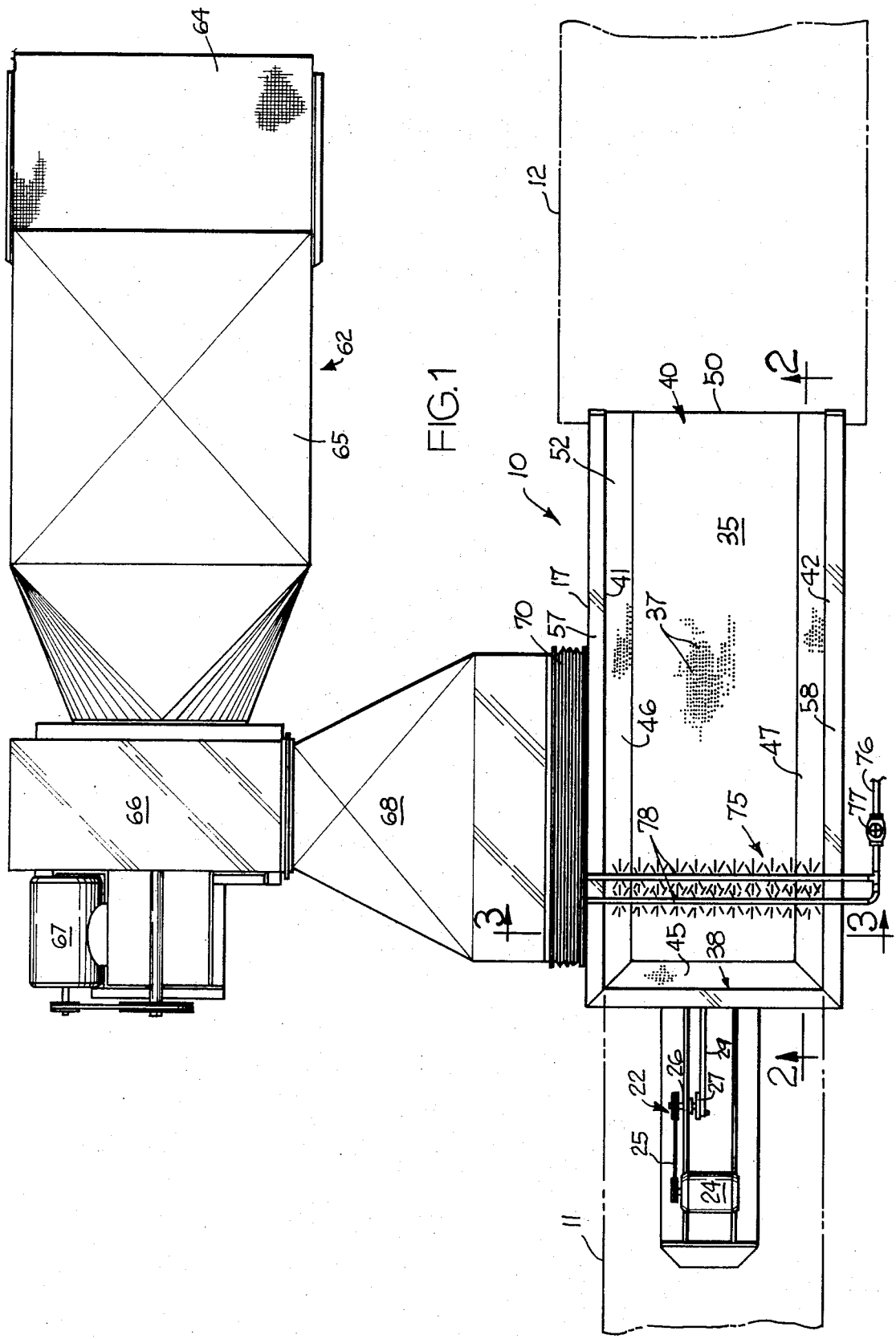
FIG. 1 is a plan view of a cooling apparatus for receiving a food product from a blancher and for rapidly cooling the vegetable product to perform the subject process.

Referring now in detail to the drawings, there is illustrated in FIG. 1 a cooling apparatus for cooling food products such as cut whole kernel corn, green peas, lima beans, broccoli, brussels sprouts, potatoes and other like heated vegetables that are discharged from a blancher or cooker. In the blancher, the food product is subjected to temperatures above 150° F. and most preferably to temperatures of between 180° and 200° F. to greatly reduce the enzyme activity in the food product to add any desired additives for preservation, etc. The purpose of the cooling apparatus 10 is to rapidly cool the vegetables from the elevated blanching or cooking temperature to approximately room temperature as rapidly as possible, without substantially increasing or decreasing the moisture content of the food product. It has been found that when there is a substantial increase or decrease in the moisture content of the vegetable there is a distinct change in the taste of the vegetables.

Figure 2:
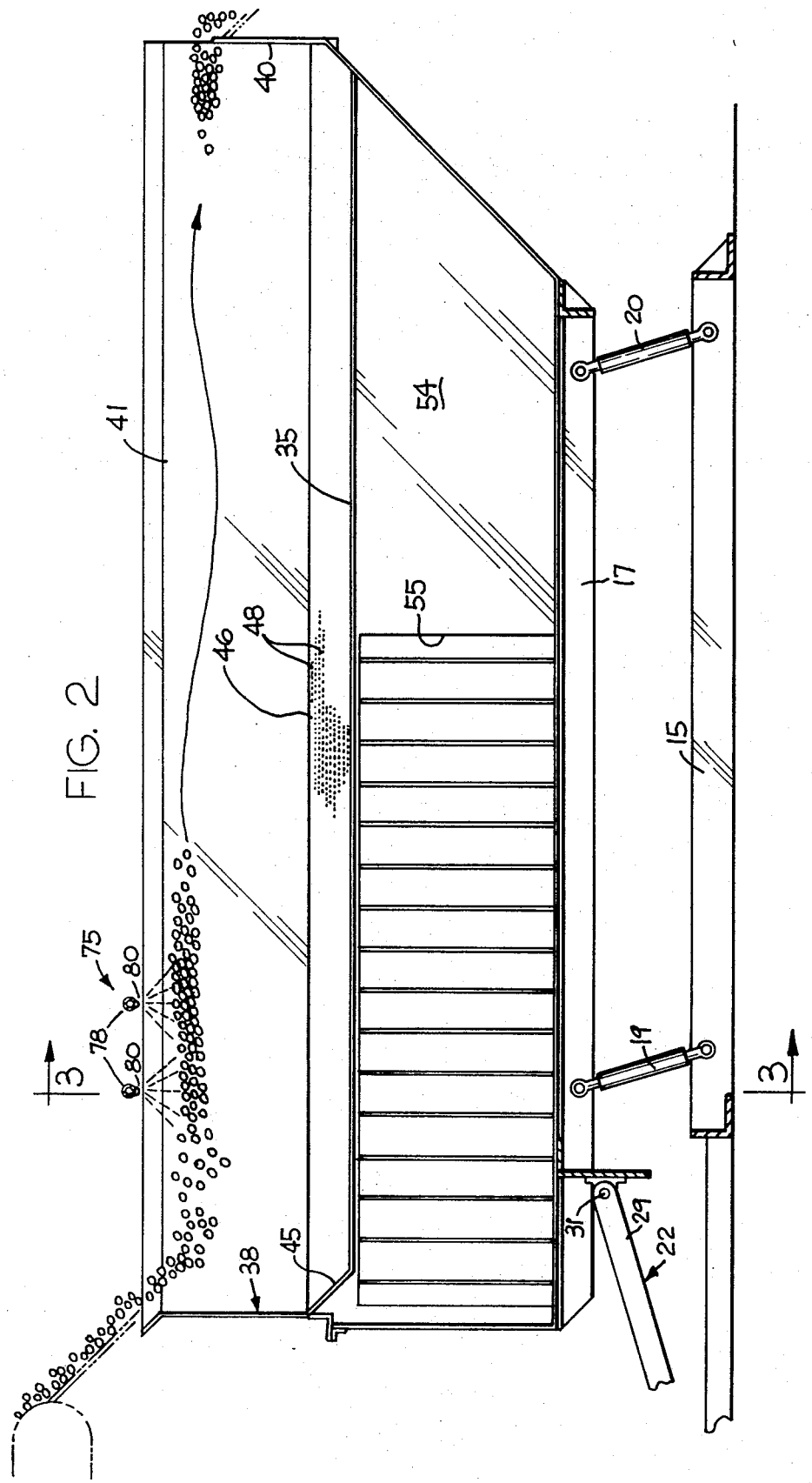
FIG. 2 is a vertical cross-sectional view taken along line 2—2 in FIG. 1.
Figure 3:
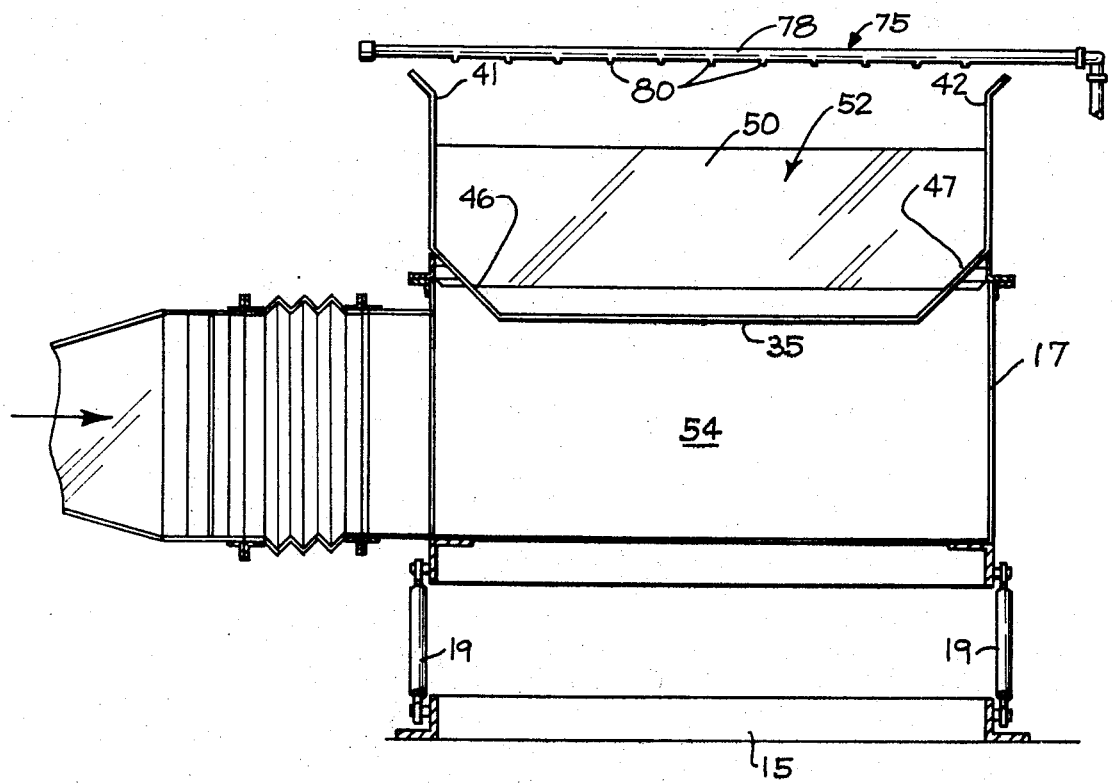
FIG. 3 is a fragmentary vertical cross-sectional view taken along line 3—3 in FIG. 1 in which the perforated plates are shown to enable air to be blown through the plates to cool the food product.

The cooling apparatus 10 receives the food products from a discharge of the blancher or cooker represented by a dotted outline identified by the numeral 11. The apparatus cools the heated food product and discharges the food product onto a conveying means also represented by a dotted line identified by the numeral 12. The cooling apparatus 10 has a general frame 15. The apparatus 10 further includes an elongated housing 17 movable mounted on the frame for reciprocating vibrational motion in a longitudinal direction. The elongated housing 17 is pivotally supported on the frame 15 by pivot links 19 and 20 (FIG. 2) in a parallelogram arrangement to maintain the elongated housing 17 substantially horizontal during its movement. An eccentric drive 22 is operatively connected to the elongated housing 17 for pivoting the elongated housing 17 upward and forward in a forward stroke and backward and downward in a return stroke. The eccentric drive 22 is powered by an electric motor 24 through a drive belt 25 to an eccentric shaft 26. A crank 27 is connected to the shaft 26 for driving a crank arm 29 that is pivotally connected to the housing at pivot conection 31. The speed of the motor 24 is adjustable to create a longitudinal directional vibrational movement of the housing of between 60 and 400 cycles per minute.

Other types of oscillating or vibrating devices can be used to achieve the desired directional vibration to convey the food product.

The housing 17 has a perforated base plate 35 with a plurality of evenly spaced perforations or holes 37 therethrough to pass air vertically therethrough. Base plate 35 is mounted in a horizontal orientation that extends from a feed end wall 38 to a discharge end 40 and between side walls 41 and 42.

A perforated inclined end plate 45 extends upward above the perforated base plate 35 in an inclined orientation to the feed end wall 38. Inclined side plates 46 and 47 extend upward above the perforated base plate 35 to the side walls 41 and 42 respectively. Preferably, the end and side plates 45–47 are oriented at approximately 45° to the base plate 35. Each of the end and side plates 45–47 have a plurality of perforations or holes 48 formed therethrough for directing air upward and inward from the end side walls 38, 41 and 42. A vertically adjustable weir 50 is mounted adjacent to the discharge end 40 and extends in a vertical orientation above the perforated base plate 35 to define in conjunction with the base plate 35 and the end and side walls 38, 41 and 42, a cooling chamber 52 for receiving the blanched food products from the blancher discharge 11 to cool the food product and deliver the food product over the weir 50 to the conveying means 12.

The housing 17 includes an enclosed elongated plenum 54 communicating with the perforated base plate 35 and the perforated end and side plates 45–47 for directing a gas such as air up through the perforations 36 and 48 into the cooling chamber 52. The plenum 54 has an entrance opening 55 (FIG. 2) for emitting air to the plenum.

The cooling apparatus 10 has an air supply system generally designated by the numeral 62 for supplying air under pressure at a temperature below 100° F. into the plenum. The air supply system 62 includes an air intake 64 that receives the air from the atmosphere and directs the air through a filter housing 65 to a fan 66. The fan 66 is driven by a motor 67 to direct air under pressure through an outlet duct 68 to the plenum. A flexible connector 70 interconnects the outlet duct 68 with the plenum 54 for directing air from the outlet duct 68 through the entrance opening 55 into the plenum 54. The air supply system 62 is designated to maintain a static air pressure in the plenum in the range of 1.0 to 8.0 inches of water, depending upon the specific food product being processed.

One of the principal features of this cooling apparatus 10 is a water spray system 75 for spraying water in the form of a mist onto the food product to maintain the food product moist without forming a water phase continuous system. The water spray prevents the food product from becoming dehydrated and also assists in cooling the food product without saturating or substantially increasing the moisture content of the food product.

The water spray system includes a water line 76 that is connected to a convenient source of water supply that is normally provided in a processing plant. It is found that a normal water supply having a temperature of between 50°–60° F. is satisfactory. Preferably, the water temperature should be below 80° F.

A valve 77 is found in the line 76 to control the rate of the water flow and the amount of water applied onto the food product. From the valve 77 the water is directed to spray headers 78. A plurality of spray nozzles 80 are fixed to the header 78 at spaced intervals for directing the water downward into the cooling chamber 52 in the form of a mist. The headers 78 extend transversely over the perforated base plate 35 to evenly distribute the water onto the food product that is being fed from the discharge 11 into the cooling chamber 52.

Air supply system 62 in conjunction with the perforated base plate 35, end plate 45 and side plates 41 and 42 is intended to generate sufficient air velocity under the food product to float or suspend the food product in a fluidized bed above the base plate 35. The size and spacing of the perforations 36 and 48 may be varied depending upon the nature of the product.

Figure 4:
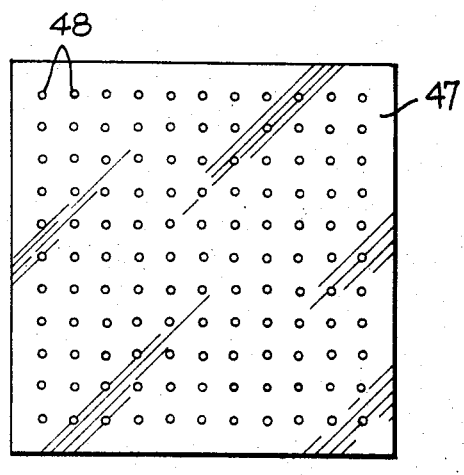
FIG. 4 is a fragmentary view of one of the plates illustrating the perforation pattern.

The size of the perforations 36 and 48 are selected in a range of 0.030 – 0.075 inches in diameter. The spacing between the perforations 37 and 48 between centerlines is selected between 0.200 and 0.400 inches depending upon the nature of the product. The perforation pattern is illustrated in FIG. 4. The air that is directed through the inclined end and side plates 38, 41 and 42 is intended to, in addition to providing some support, maintain the food product away from the end and side walls to prevent the food product from sticking thereto and hindering its flow from the feed to the discharge end 40.

The cooling of the heated food product is accomplished by a combination of three mechanisms: (1) contacting the heated food product with water having a temperature substantially less than the temperature of the food product; (2) contacting the heated food product with the air that is directed up through the perforated base plate 35 and through the fluidized bed that has a temperature substantially less than the of the food product, and (3) evaporating at least some of the surface water from the heated food products to further cool the product. By these means, the food product is rapidly cooled to approximately room temperature in less than a minute. For example, it has been found that the cooling apparatus 10 is capable of cooling cut whole kernel corn from a temperature of 190° F. as it leaves the blancher to 70° F. within 45 seconds.

A very important feature of this invention is to provide a sufficient water spray to maintain the food product moist as it moves from the intake end 38 to the discharge end 40 but to prevent the formation of a water continuous system such as is provided by a tank of water. Any excess water, not attracted to the product by surface tension is carried away in the air stream. In this way, it has been found that there is no substantial increase or decrease in the moisture content of food product thereby maintained the natural taste of the product even after the product is frozen. previous cooling processes substantially increased or decreased the moisture content which significantly changes the taste of some vegetables particularly corn.

The vibrational movement of the housing 17 causes the fluidized bed to evenly flow from the intake end 38 to the end 40. The height of the weir 50 may be vertically adjusted in coordination to the blancher discharger rate to obtain the desired bed depth and residence time of the food product in the cooling chamber 52. The rate of water application is regulated in coordination with the product flow rate to make sure that the food product passing over the weir is moist.

An additional advantage resulting from the application of water spray onto the surfaces of the food product, is the increase in flowability of the food product as a floating fluidized bed. It was noticed that when the application of the spray was discontinued, the surfaces of the food product quickly became rather dry, decreasing the flowability of the food product with individual particles jumping widly above the bed. It is believed that the difference is caused by the water acting as a lubricant enabling the particles to flow more readily.

From the cooling apparatus 10 the food product is directed by the output conveying means to a feezing operation in which the food product is rapidly frozen.

It should be understood that the above described embodiment is simply illustrative of the principles of the invention and numerous other embodiments may be readily devised without deviating therefrom. Therefore, only the following claims are intended to define this invention.

We claim:

1. A method for cooling a heated food product to room temperature without substantially increasing or decreasing the moisture content of the food product, comprising the steps of:

forming the heated food product in a fluidized bed, continuously spraying water as a mist onto said product to maintain said heated food product moist while simultaneously directing air upward through said fluidized bed to evaporate a portion of said sprayed water to rapidly cool said heated food product to approximately ambient room temperature without substantially increasing or decreasing the moisture content of said food product, said air being directed upward through a perforated support at a velocity sufficient to suspend said food product above said perforated support as said fluidized bed;

continuously feeding the food product onto one end of said perforated support; and vibrating said perforated support in a directional occillational motion to continuously move the food product along said perforated support to another end of said perforated support.

2. The method as defined in claim 1 wherein the heated food product has an initial temperature greater than 150° F. and wherein the gas has an initial temperature of approximately ambient room temperature.

3. The method as defined in claim 1 wherein the sprayed water has an initial temperature less than 80° F. and partially cools the food product as the water is sprayed onto the product.

4. The method as defined in claim 1 further comprising the step of regulating the amount of water sprayed onto the food product in response to the movement of the food product to the other end of the perforated support to maintain the product moist without forming a continuous liquid phase in the bed to prevent a substantial increase or decrease in the moisture content of the product as the product is being cooled.

* * * * *